Patented Apr. 29, 1952

2,595,170

UNITED STATES PATENT OFFICE 2,595,170

STABILIZED MINERAL OIL

Harry W. Rudel, Roselle Park, and Abraham D. Kirshenbaum, Union, N. J., assignors to Standard Oil Development Company, a corporation of Delaware No Drawing. Application November 14, 1949, Serial No. 127,274

24 Claims. (Cl. 252—46.6)

1

The present invention relates to mineral oil compositions containing as an additive an oxidation inhibiting or corrosion resisting agent.

Oxidation inhibiting addition agents for mineral oils, and especially for mineral lubricating oils, have been previously made by sulfurizing fats, fatty oils and hydrocarbon materials with free sulfur by heating at an elevated temperature, and while such products have been used for many years, they are not satisfactory because the sulfurization is accompanied by side reactions such as cracking, polymerization, and the like, which give rise to inactive constituents and darkly colored bodies, some of which may be merely useless while others are decidedly objectionable.

It is known that sulfurized materials of a more satisfactory character can be formed by sulfurizing olefin hydrocarbons, especially the polymers of low molecular weight olefins, and more specifically the polymers of propylene, the butylenes, and the amylenes. These materials may be sulfurized by heating with free sulfur, but it has been found that a more satisfactory product from the standpoint of color, oil solubility, lack of copper-staining tendency and odor, can be obtained by sulfurizing with a sulfur halide, such as sulfur monochloride or sulfur dichloride, or the corresponding sulfur bromides. Unfortunately, it is difficult to free the product from a considerable proportion of the halogen. An amount of halogen up to 10% or greater will remain in the sulfurized product even after heating for long periods of time. For certain purposes such amounts of halogen are very objectionable, especially where corrosion is to be avoided.

In accordance with the present invention an aliphatic, cycloaliphatic, or other non-aromatic hydrocarbon which has been sulfurized by means of a sulfur halide can be dehalogenated with little difficulty and at the same time converted into a product containing phosphorus and additional sulfur by heating such sulfurized and halogenated product with an alkali metal organo-substituted thiophosphite or dithiophosphate. By this process the halogen is substantially completely removed in the form of an alkali metal halide and the thiophosphite or dithiophosphate group is joined at the position or positions occupied by the halogen.

The thiophosphite or dithiophosphate salt which is employed in accordance with the present invention may be more exactly defined by the formula:

2

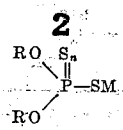

where R is a hydrocarbon radical containing 2 to 30, preferably 2 to 18, carbon atoms and may be an alkyl, saturated cycloaliphatic, aromatic, aralkyl, or alkaryl radical; M is an alkali metal; and $n$ is 0 or 1.

The organo-substituted thiophosphorous or dithiophosphoric acids from which the alkali metal salts are derived may be prepared by well-known methods, as for example by reacting a sulfide of phosphorus with an alcohol or phenol at any convenient reacting temperature ranging from room temperature to about 250° F.

Among the alcohols which are generally preferred for use as starting materials in the preparation of the acids of phosphorus may be mentioned ethyl, isopropyl, and amyl alcohols, 2-ethylhexanol, methylcyclohexanol, a commercial mixture of $C_{10}$ to $C_{18}$ alcohols known as "Lorol alcohol," lauryl alcohol, stearyl alcohol, alcohols derived from wool fat, sperm oil, natural waxes and the like, alcohols produced by the oxidation of petroleum hydrocarbon products, "Oxo" alcohols produced from olefins, carbon monoxide and hydrogen, and similar compounds. When compounds having an aromatic group in the phosphorous-containing radical are desired, the starting materials will normally be phenols. Compounds of this type which are suitable for the formation of additives of the present invention are alkylated phenols, e. g., butyl phenol, amyl phenol, diamyl phenol, tert.-octyl phenol, cetyl phenol, petroleum phenols, and the like, as well as the corresponding naphthols.

The alkali metal salts of the above described acids of phosphorus may be readily prepared by reacting the acid with an alkali metal hydroxide. The latter may be conveniently dissolved in methanol as the solvent, and the solution is added slowly at a temperature of about 30 to 50° C. until the acid is neutralized. The water of reaction and the solvent may then be removed by heating on the steam bath.

The hydrocarbon materials which may be sulfurized by sulfur halides and then reduced in halogen content and converted into products containing phosphorus and an increased amount of sulfur by the method of the present invention include any aliphatic, cycloaliphatic, terpenic, or other non-aromatic, non-acetylenic hydrocarbons containing a double bond carbon-to-carbon linkage. This group of materials includes the olefins, e. g., propylenes, butylenes, diisobutylenes, triisobutylenes, the codimer of isobutylene and n-butylene, also cracked gasoline fractions, cracked paraffin wax, viscous olefin polymers such as medium or high molecular weight polybutene, cyclopentene, cyclohexene, butadiene, pentadiene, isoprene, dipentene, α-pinene, β-pinene, terpinolene, Δ2,4(8)-p-menthadiene, and the like. Hydrocarbons of less than three carbon atoms are not generally employed in preparing sulfurized mineral oil additives, but on the other hand the hydrocarbon may contain as many as thirty carbon atoms per molecule. Derivatives of the above described compounds containing various non-reactive substituent groups, such as nitro groups, may be used to advantage, since such groups would not interfere with the sulfurization reaction or the dehalogenating process herein described.

For the preparation of the sulfurized hydrocarbons the most suitable sulfur halides are sulfur dichloride and monochloride, especially the latter. The olefinic material and sulfur halides are generally reacted in molal ratios from about 3:1 to about 1:1. Higher ratios of olefinic materials are sometimes used when a portion of the same is to serve as a solvent to be removed later as unreacted material. The temperatures which have been found most satisfactory for this reaction are from about 50° to 100° C., but the method may be carried out at higher or lower temperatures if desired. Catalysts are not required.

In the dehalogenating process of the present invention the sulfurized and halogenated product is merely heated in the presence of the alkali metal thiophosphite or dithiophosphate, preferably at temperatures from about 50 to 150° C. The reaction may be caused to take place either with or without the presence of a solvent, but it is generally preferred to employ a solvent, such as ethyl alcohol, isopropyl alcohol, acetone, methyl ethyl ketone, diethylene oxide and the like. The solvent selected should be one in which the by-product alkali metal halide is insoluble, in order that the by-product will be precipitated out of solution and be readily removed by decantation or filtration. The heating is conveniently carried out under refluxing conditions. The dehalogenation is rapid and is generally accomplished within a period of less than one-half hour. It is preferable to employ an amount of alkali metal thiophosphite or dithiophosphate which is a stoichiometrical equivalent of the halogen which is present in the sulfurized and halogenated hydrocarbon product. If desired, additional sulfur may be present during the dehalogenation reaction, whereby an additional amount of sulfur may be introduced into the final product.

When the products of the present invention are added to mineral oils for the purpose of inhibiting oxidation in the same when in contact with air, they are preferably added in proportions of 0.001 to about 5%, preferably 0.01 to 2%. The proportions giving the best results in given cases will vary somewhat according to the nature of the additive and of the base oil and in accordance with the specific purpose the oil is to serve in a given case. For commercial purposes, when the additive is to be employed in mineral lubricating oils, it is convenient to prepare concentrated lubricating oil solutions in which the amount of the additive in the composition ranges from 25% to 50% by weight, and to transport and store them in such form. In preparing a lubricating oil composition for use, as in the crankcase of an internal combustion engine, the additive concentrate is merely blended with the base oil in the required amount.

Below are given detailed descriptions of the preparation and testing of two examples of a mineral oil additive prepared in accordance with the method of the present invention. It is to be understood that these examples are given by way of illustration only and are not to be construed as limiting the scope of the present invention in any way.

Example 1

(a) 707 g. (6.3 mols) of diisobutylene were heated to 80° C. in a reaction flask and 707 g. (5.2 mols) of sulfur monochloride was slowly added with stirring while maintaining the temperature below 100° C., the rate of addition being 400 cc. per hour. After all of the sulfur monochloride was added the reactants were heated at 80-100° C. for ¾ hour additional. The product was blown with nitrogen for 1 hour while heating on the steam bath to remove hydrogen chloride formed. The product contained 28.1% of sulfur and 12.9% chlorine.

(b) 260 g. (2 mols) of 2-ethylhexanol and 111 g. (0.5 mol) phosphorus pentasulfide were mixed with rapid stirring for 45 minutes at 100° C. The product was filtered through "Hyflo" (a filter-aid) and blown with nitrogen gas for 15 minutes to remove hydrogen sulfide. The dithiophosphoric acid formed was reacted with a solution of 56 g. (1.0 mol) of potassium hydroxide in 200 cc. of methanol, the alkali solution being added slowly for a period of 1 hour with rapid stirring until the acid was neutralized. The water and methanol were removed by heating on the steam bath.

(c) 200 g. of crude sulfur chloride-treated diisobutylene (prepared as described in (a) and containing 0.73 gram atoms of chlorine) was reacted with 190 g. (0.49 mol) of potassium di-2-ethylhexyl dithiophosphate (prepared as in (b)) for 1½ hours at 100-125° C. The product was filtered through "Hyflo" to remove the precipitated potassium chloride. The product contained 25.35% sulfur, 4.51% phosphorus, and 2.22% chlorine.

Example 2

(a) 146.5 g. (0.66 mol) of $P_2S_5$ was added to 174.5 g. (2.9 mols) of 99% isopropyl alcohol portionwise over a period of 10 minutes, maintaining the temperature between 25 and 30° C. by external cooling. The reaction temperature was then increased to 50° C. for 1 hour and to 100° C. for 2 hours. The product was filtered through "Hyflo." 236 g. (1.1 mols) of the diisopropyl dithiophosphoric acid having a neutralization number of 245 mg. KOH/g. was reacted with a solution of 57.8 g. (1.03 mols) of potassium hydroxide dissolved in 300 cc. of isopropyl alcohol, and the mixture heated for ½ hour at refluxing temperature.

(b) 797 g. (5.9 mols) of sulfur monochloride was slowly added to 841 g. (6.2 mols) of commercial dipentene (containing 90% of reactive olefins)[1] at a rate of 15-20 cc. per minute with

---

[1] The commercial "dipentene" employed had the following composition:

| | Per cent |
|---|---|
| Dipentene | 31 |
| Terpinolene | 39 |
| α-Pinene | 6 |
| α-Terpineol | 7 |
| Δ2,4(8)-p-menthadiene | 5 |
| Residue | 2 |
| Para cymene | 10 | constant agitation. The reaction was highly exothermic and the temperature was maintained between 75 and 100° C. by external cooling. The viscous product thus formed contained 23.7% of sulfur and 17.4% of chlorine.

(c) 210 g. of the crude sulfur chloride-treated dipentene from (b) (containing 1.03 gram atoms of chlorine) was added to the alcoholic solution of the potassium diisopropyl dithiophosphate described in (a) (containing 1.03 mols of the potassium salt) and the mixture refluxed for 3 hours with agitation (90–100° C.). The product was filtered thru "Hyflo" to remove the precipitated potassium chloride and the solvent and unreacted dipentene removed by distillation. The product contained 34.5% sulfur and 3.1% phosphorus.

*Example 3—Lauson engine test*

The products prepared as described in Examples 1 and 2 were tested in a Lauson engine, using blends of 1% by weight of each of the additives in a solvent extracted naphthenic oil of SAE 30 grade. For comparison, a sample of the unblended base oil was likewise tested. The test was conducted for a period of 25 hours, the Lauson engine being operated at 1800 R. P. M. with a 1.5 indicated kilowatt load, 300° F. oil temperature and 295° F. water jacket temperature. The oils were rated on a demerit system wherein an oil giving a perfectly clean piston surface is given a rating of 0, while a rating of 10 is given to an oil giving the worst condition which could be expected on that surface. Observations were also made on the loss in weight of the copper-lead bearing during each test. The results are shown in the following table:

| Lubricant | Piston Varnish Demerit | Cu-Pb Bearing Wt. Loss (Gm./Bearing) |
| --- | --- | --- |
| Unblended base oil | 4.25 | 0.137 |
| Base oil + 1% product of Example 1 | 4.25 | 0.030 |
| Base oil + 1% product of Example 2 | 5.50 | 0.030 |

*Example 4—Laboratory bearing corrosion test*

A blend was prepared containing 0.5% by weight of each of the additives prepared as described in Examples 1 and 2, using as the base oil an extracted Mid-continent paraffinic lubricating oil of SAE 20 grade. Samples of these blends and a sample of the unblended base oil were submitted to a laboratory test designed to measure the effectiveness of the additive in inhibiting the corrosiveness of a typical mineral lubricating oil towards the surfaces of copper-lead bearings. The test was conducted as follows:

500 cc. of the oil was placed in a glass oxidation tube (13 inches long and 2⅝ inches in diameter) fitted at the bottom with a ¼ inch air inlet tube perforated to facilitate air distribution. The oxidation tube was then immersed in a heating bath so that the oil temperature was maintained at 325° F. during the test. Two quarter sections of automotive bearings of copper-lead alloy of known weight having a total area of 25 sq. cm. were attached to opposite sides of a stainless steel rod which was then immersed in the test oil and rotated at 600 R. P. M., thus providing sufficient agitation of the sample during the test. Air was then blown through the oil at the rate of 2 cu. ft. per hour. At the end of each four-hour period the bearings were removed, washed with naphtha and weighed to determine the amount of loss by corrosion. The bearings were then repolished (to increase the severity of the test), reweighed, and then subjected to the test for additional four-hour periods in like manner. The results are given in the following table as "corrosion life," which indicates the number of hours required for the bearings to lose 100 mg. in weight, determined by interpolation of the data obtained in the various periods.

| Oil | Bearing Corrosion Life (Hrs.) |
| --- | --- |
| Unblended base oil | 10 |
| Base oil + 0.5% product of Example 1 | 22 |
| Base oil + 0.5% product of Example 2 | 35 |

It can be seen from the results shown above that the product prepared in accordance with the present invention is particularly effective in reducing the corrosion of copper-lead bearings and that it does not substantially increase the formation of varnish on engine parts. The varnish forming tendency may be easily reduced by the use of detergent additives.

The products of the present invention may be employed not only in ordinary hydrocarbon lubricating oils but also in the "heavy duty" type of lubricating oils which have been compounded with such detergent type additives as metal soaps, metal petroleum sulfonates, metal phenates, metal alcoholates, metal alkyl phenol sulfides, metal organo phosphates, phosphites, thiophosphates, and thiophosphites, metal xanthates and thioxanthates, metal thiocarbamates, and the like. Other types of additives, such as phenols and phenol sulfides, may also be present.

The lubricating oil base stock used in the compositions of this invention may be straight mineral lubricating oils or distillates derived from paraffinic, naphthenic, asphaltic or mixed base crudes, or, if desired, various blended oils may be employed as well as residuals, particularly those from which asphaltic constituents have been carefully removed. The oils may be refined by conventional methods using acid, alkali and/or clay or other agents such as aluminum chloride, or they may be extracted oils produced by solvent extraction with solvents such as phenol, sulfur dioxide, etc. Hydrogenated oils or white oils may be employed as well as synthetic oils prepared, for example, by the polymerization of olefins or by the reaction of oxides of carbon with hydrogen or by the hydrogenation of coal or its products. In certain instances cracking oil tar fractions and coal tar or shale oil distillates may also be used. Also, for special applications, animal, vegetable or fish oils or their hydrogenated or voltolized products may be employed in admixtures with mineral oils.

For the best results the base stock chosen should normally be an oil which with the new additive present gives the optimum performance in the service contemplated. However, since one advantage of the additives is that their use also makes feasible the employment of less satisfactory mineral oils, no strict rule can be laid down for the choice of the base stock. The additives are normally sufficiently soluble in the base stock, but in some cases auxiliary solvent agents may be used. The lubricating oils will usually range from about 40 to 150 seconds (Saybolt) viscosity at 210° F. The viscosity index may range from 0 to 100 or even higher.

Other agents than those which have been mentioned may be present in the oil composition, such as dyes, pour point depressants, heat thickened fatty oils, sulfurized fatty oils, sludge dispersers, anti-oxidants, thickeners, viscosity index improvers, oiliness agents, resins, rubber, olefin polymers, and the like.

Assisting agents which are particularly desirable as plasticizers and defoamers are the higher alcohols having preferably 8–20 carbon atoms, e. g., octyl alcohol, lauryl alcohol, stearyl alcohol, and the like.

In addition to being employed in lubricants, the additives of the present invention may also be used in other mineral oil products such as motor fuels, hydraulic fuels, torque converter fluids, cutting oils, flushing oils, turbine oils, transformer oils, industrial oils, process oils, and the like, and generally as antioxidants in mineral oil products. They may also be used in gear lubricants, greases and other products containing mineral oils as ingredients.

What is claimed is:

1. A composition consisting essentially of a mineral oil and an oxidation inhibiting quantity of a product obtained by reacting a double-bonded non-aromatic, non-acetylenic hydrocarbon containing at least 3 carbon atoms with a sulfur halide selected from the class consisting of sulfur chlorides and sulfur bromides, whereby an intermediate product containing added sulfur and halogen is formed, and heating together at a temperature in the range of about 50° to 150° C. such intermediate product and a dithiophosphate compound of the formula

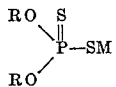

where R is a hydrocarbon radical selected from the group consisting of alkyl radicals, saturated cycloaliphatic radicals, aromatic radicals and alkaryl radicals, the radicals having from 2 to 30 carbon atoms each, and M is an alkali metal under conditions whereby the halogen in said intermediate product is substantially completely replaced by dithiophosphate radicals.

2. A composition according to claim 1 in which the mineral oil is a lubricating oil fraction.

3. A composition according to claim 2 in which the hydrocarbon which is reacted with the sulfur halide is an olefin.

4. A composition according to claim 3 in which the olefin is diisobutylene.

5. A composition according to claim 2 in which the hydrocarbon which is reacted with the sulfur halide is a terpene.

6. A composition according to claim 1 in which the mineral oil is a lubricating oil fraction and in which the dithiophosphate compound is a potassium dialkyl dithiophosphate in which each alkyl radical contains 2 to 9 carbon atoms.

7. A composition according to claim 6 in which the hydrocarbon which is reacted with the sulfur halide is an olefin and in which the sulfur halide is sulfur monochloride.

8. A composition according to claim 7 in which the alkyl groups of the potassium salt are 2-ethylhexyl groups and in which the olefin is diisobutylene.

9. A composition according to claim 6 in which the hydrocarbon which is reacted with the sulfur halide is a terpene.

10. A composition according to claim 9 in which the alkyl groups of the potassium salt are isopropyl groups.

11. A composition consisting essentially of a mineral lubricating oil and an additive as defined in claim 1, the amount of said additive in the composition being 25–50% by weight.

12. A composition consisting essentially of a mineral lubricating oil and a product obtained by reacting diisobutylene with an equivalent molecular quantity of sulfur monochloride, whereby an intermediate product is formed containing added sulfur and chlorine, and heating together at a temperature in the range of about 50° to 150° C. such intermediate product with an amount stoichiometrically equivalent to the chlorine present in said intermediate product of potassium di-2-ethylhexyl dithiophosphate whereby said chlorine is substantially completely replaced by di-2-ethylhexyl dithiophosphate radical and removing the by-product potassium chloride from the organic reaction product, the amount of said reaction product in the entire composition being 25–50% by weight.

13. The method which comprises reacting a double-bonded non-aromatic, non-acetylenic hydrocarbon containing at least three carbon atoms, with a sulfur halide selected from the class consisting of sulfur chlorides and sulfur bromides to form a hydrocarbon product containing added sulfur and halogen, and heating together at a temperature in the range of about 50° to 150° C. such product with a dithiophosphate compound of the formula

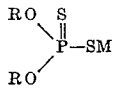

where R is a hydrocarbon radical selected from the group consisting of alkyl radicals, saturated cycloaliphatic radicals, aromatic radicals, and alkaryl radicals, the radicals having from 2 to 30 carbon atoms each; and M is an alkali metal; under conditions which cause the separation of the by-product alkali metal halide as a distinct phase and the substantially complete replacement of halogen in said product with dithiophosphate radical.

14. A method according to claim 13 in which the reaction with the alkali metal salt is conducted in a medium in which the by-product metal halide is insoluble.

15. A method according to claim 14 in which the double-bonded non-aromatic hydrocarbon is an olefin and in which the sulfur halide is a sulfur monochloride.

16. A method according to claim 15 in which the olefin is diisobutylene.

17. A method according to claim 14 in which the double-bonded non-aromatic hydrocarbon is a terpene.

18. A method according to claim 14 in which the alkali metal salt is potassium di-alkyl dithiophosphate.

19. A method according to claim 18 in which the alkyl groups of the potassium salt are 2-ethylhexyl groups.

20. A method according to claim 19 in which the potassium di-2-ethylhexyl dithiophosphate is reacted with sulfurized and halogenated diisobutylene at a temperature of 100–125° C.

21. A method according to claim 18 in which the alkyl groups of the potassium salt are isopropyl groups.

22. A method according to claim 21 in which the potassium diisopropyl dithiophosphate is reacted with a sulfurized and halogenated terpene at a temperature of 90–100° C.

23. A method according to claim 13 in which said non-aromatic hydrocarbon is selected from the group consisting of aliphatic, cycloaliphatic, and terpenic mono-olefins and diolefins having 3 to 30 carbon atoms.

24. A composition according to claim 1 in which said non-aromatic hydrocarbon is selected from the group consisting of aliphatic, cycloaliphatic and terpenic mono-olefins and diolefins having 3 to 30 carbon atoms.

HARRY W. RUDEL.
ABRAHAM D. KIRSHENBAUM.

REFERENCES CITED

The following references are of record in the file of this patent:

UNITED STATES PATENTS

| Number | Name | Date |
|---|---|---|
| 2,413,648 | Ott | Dec. 31, 1946 |
| 2,494,332 | Cyphers | Jan. 10, 1950 |